Nov. 14, 1967 W. E. HAAS 3,352,529
MOLD APPARATUS FOR HOLLOW BUILDING ELEMENTS
Filed Oct. 22, 1965 5 Sheets-Sheet 1
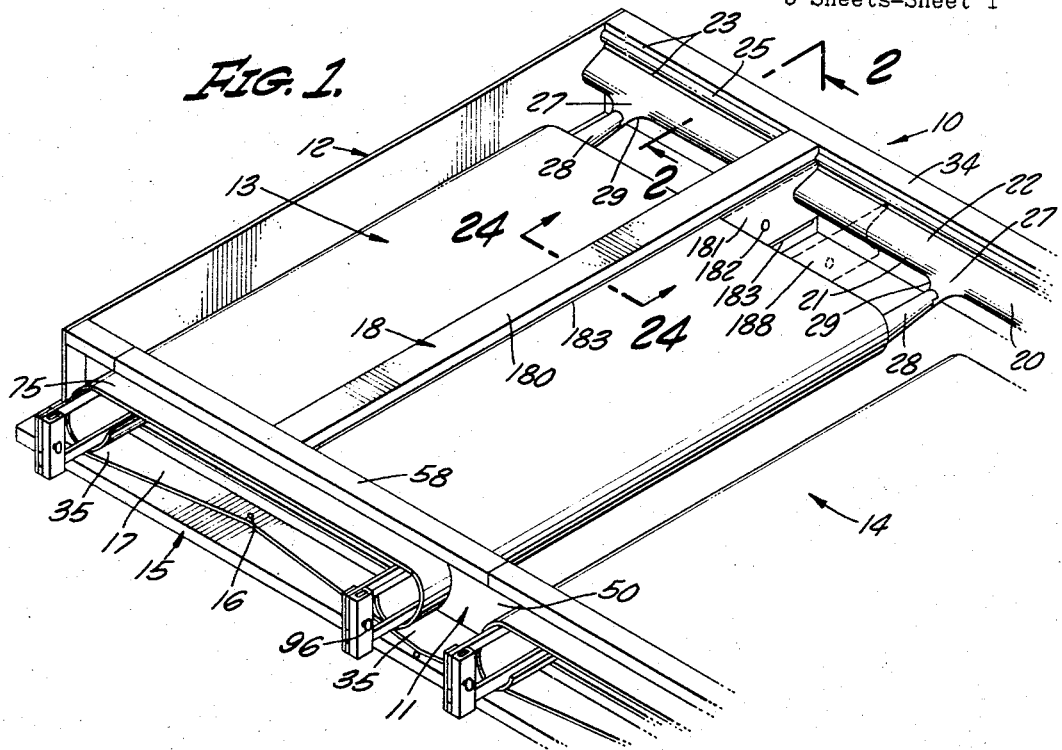
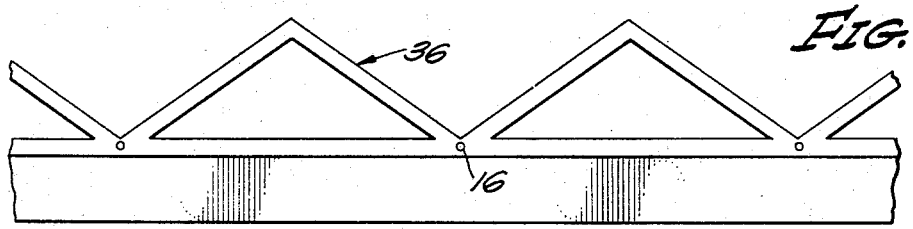
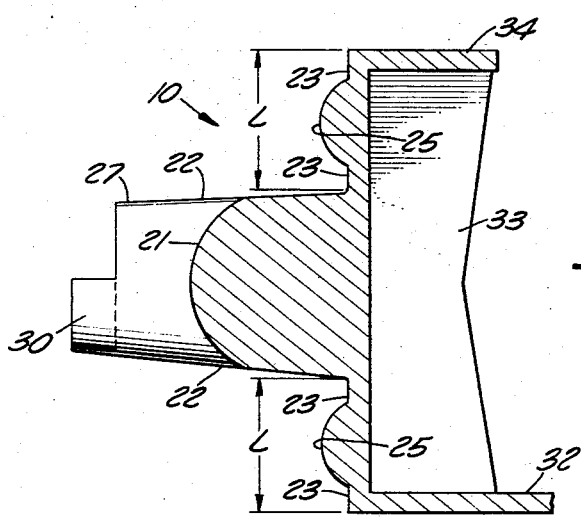
INVENTOR.
WILSON E. HAAS
BY
Lyon & Lyon
ATTORNEYS Nov. 14, 1967 W. E. HAAS 3,352,529
MOLD APPARATUS FOR HOLLOW BUILDING ELEMENTS
Filed Oct. 22, 1965 5 Sheets-Sheet 2

INVENTOR.
WILSON E. HAAS
BY Lyon & Lyon
ATTORNEYS

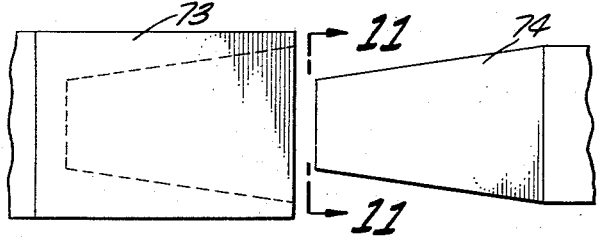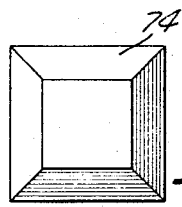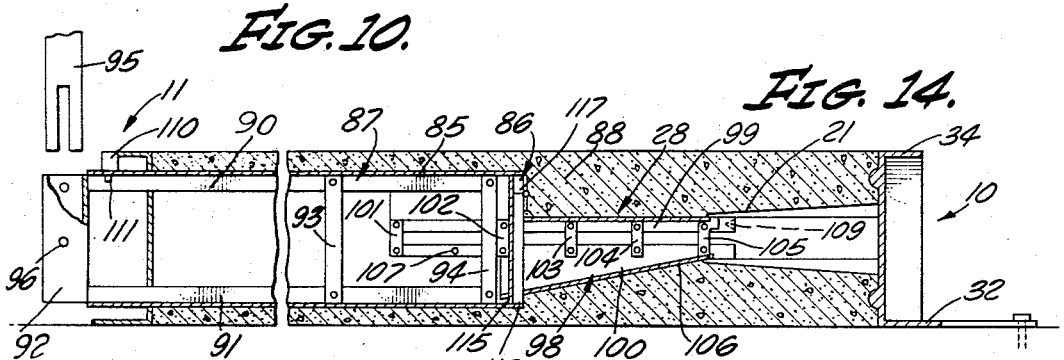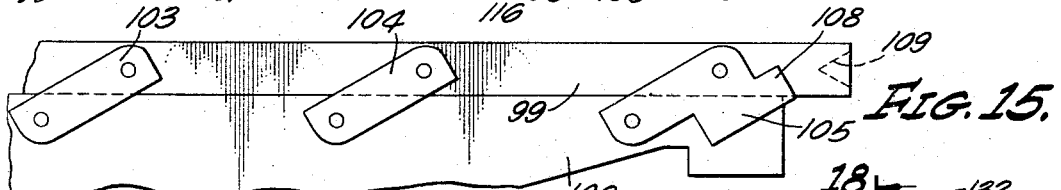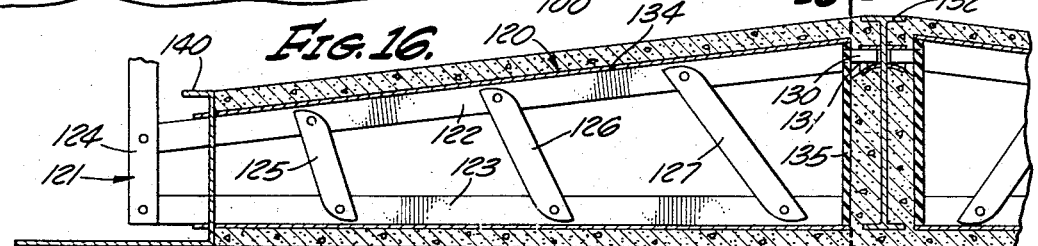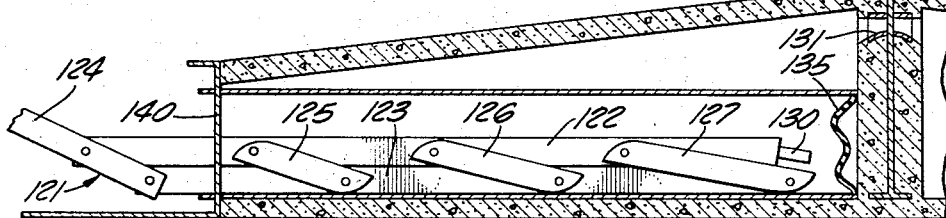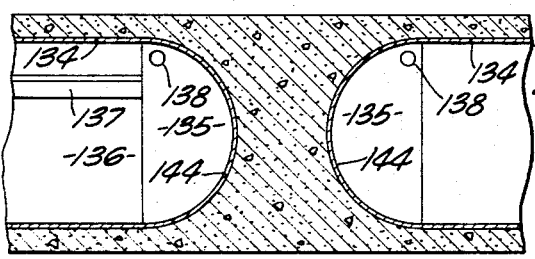

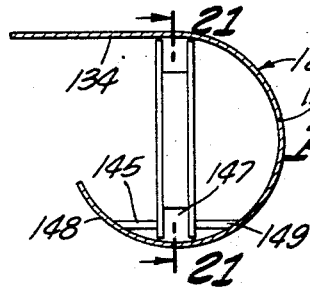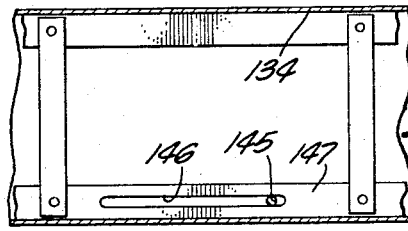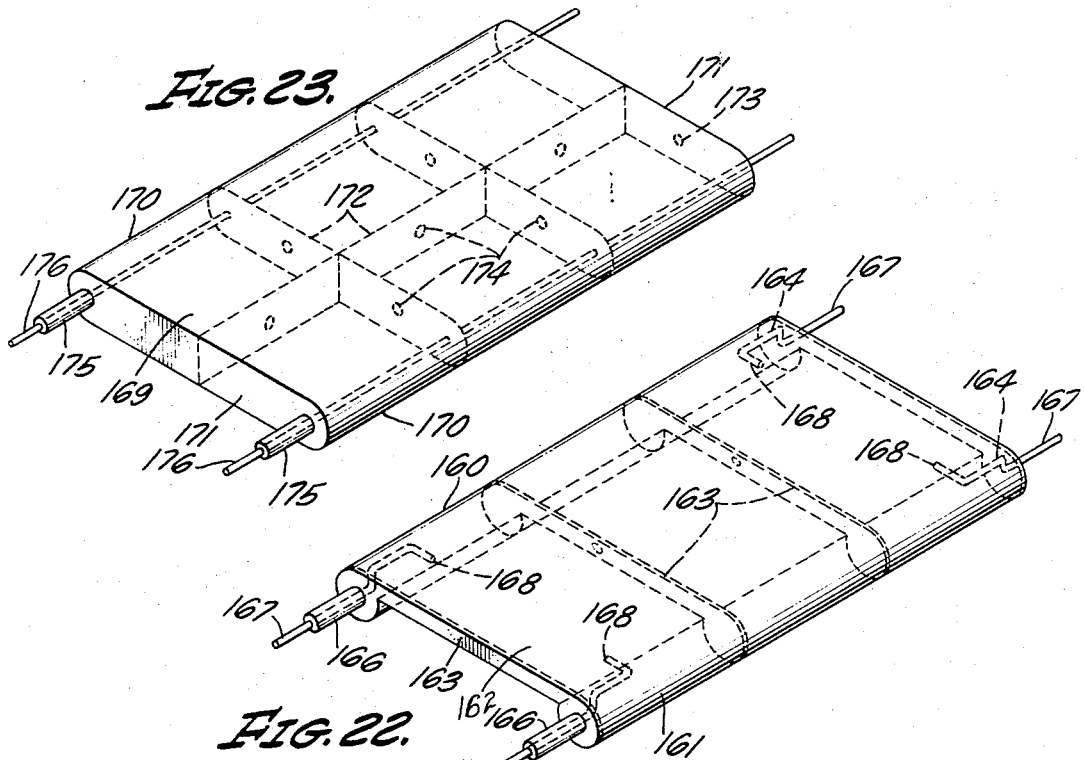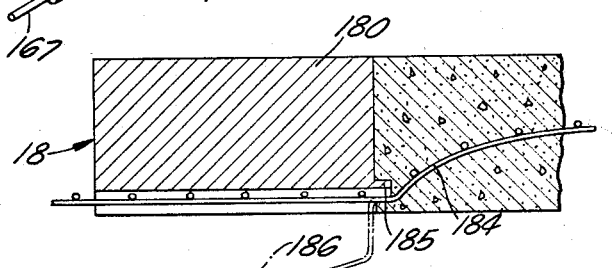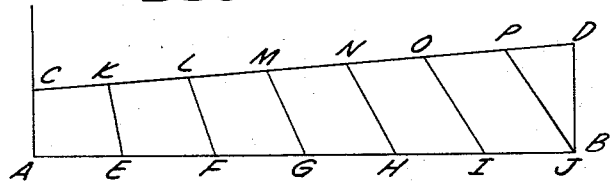

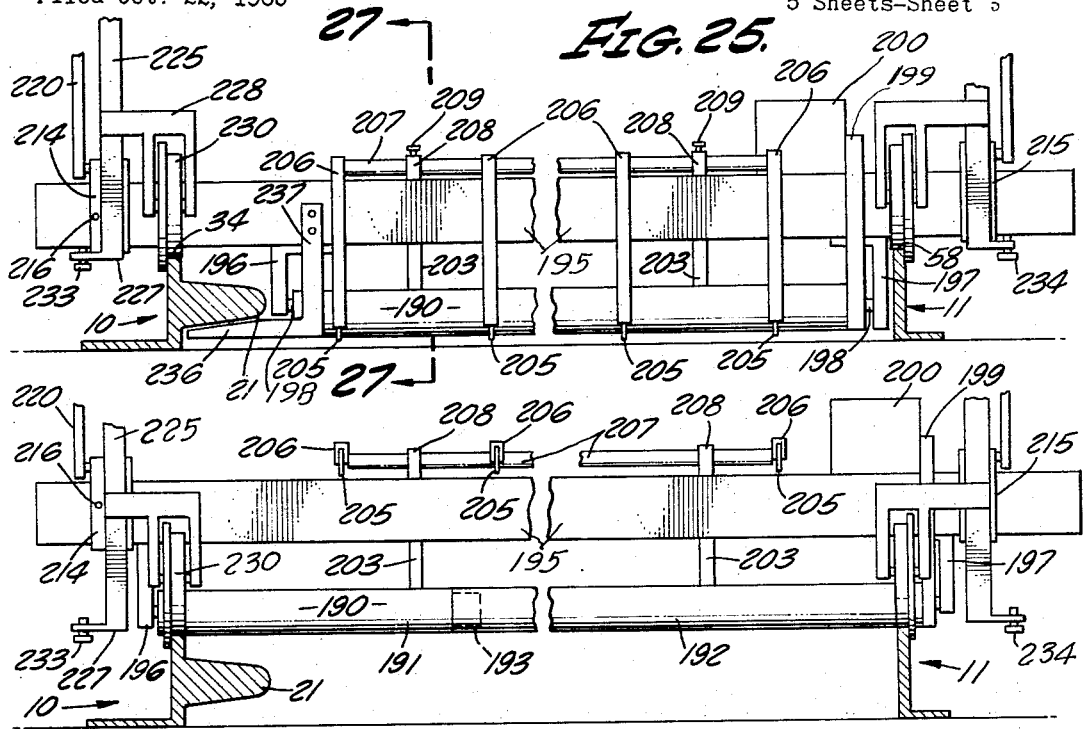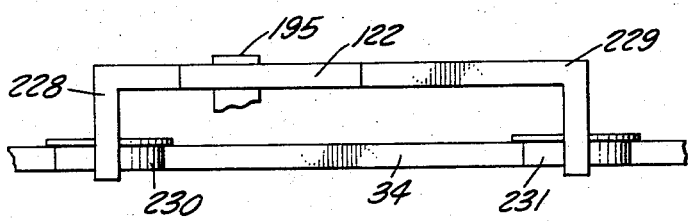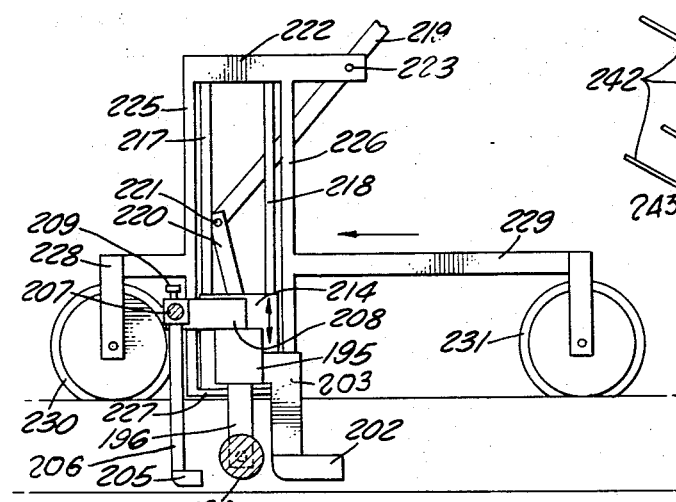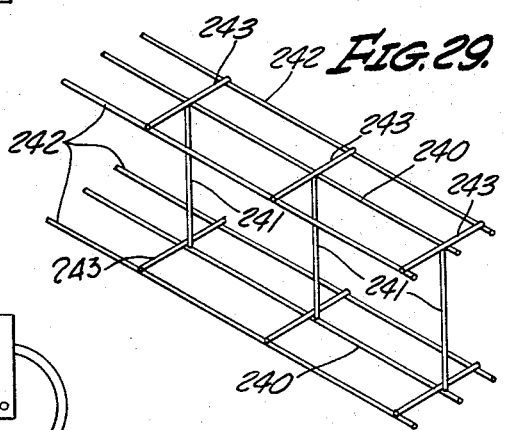

United States Patent Office 3,352,529
Patented Nov. 14, 1967

3,352,529
MOLD APPARATUS FOR HOLLOW
BUILDING ELEMENTS
Wilson E. Haas, 63-770 Dillon Road,
Palm Springs, Calif. 92262
Filed Oct. 22, 1965, Ser. No. 501,106
17 Claims. (Cl. 249—142)

The present invention relates generally to improved apparatus for constructing hollow concrete panels for use as walls, floors, roofs, and similar elements. This application is a continuation-in-part of application Ser. No. 255,147, filed Jan. 25, 1963, now Patent No. 3,222,749.

More specifically, the invention relates to collapsible molds together with improved knock down form means for easily and rapidly casting a concrete panel having hollow cores.

An object, therefore, of the present invention is to provide improved apparatus for casting concrete panels for use as walls, floors, roofs, and similar elements which require a relatively few number of parts and which can be easily used directly at the construction site, thus minimizing the handling and transportation expenses of precast panels.

It is a further object of this invention to provide an improved mold and form for casting concrete panels with hollow cores which is readily collapsible, simple to operate, easy to clean, and economical to manufacture, and which can be used in grouped assemblies to cast an entire wall, floor, or roof panel.

It is another object of the present invention to provide a means for casting a concrete panel which is monolithic and does not require the addition of columns, beams, column supports or framework and which may be provided with integral passageways for the installation of wiring, plumbing, and the like.

It is a further object of this invention to provide means for constructing walls, floors or roofs of lightweight and good insulation qualities because of large hollow cores, but of high structural strength.

It is yet another object of the present invention to provide a novel and improved mold and form for casting concrete panels.

It is an additional object of this invention to provide improved collapsible mold structures.

Other objects and advantages of the present invention will be more apparent upon reference to the accompanying description and drawings in which:

FIGURE 1 is a perspective view of a portion of a form and mold for casting concrete panels according to the present invention;

FIGURE 2 is a sectional view of a top form taken along a line 2—2 of FIGURE 1;

FIGURE 3 is a top view of a truss flange which may be used with the form in FIGURE 1;

FIGURE 10 is a view of a tapered pin and socket which may be used with the apparatus in FIGURE 6;

FIGURE 11 is a top view of the pin in FIGURE 10 taken along a line 11—11 thereof;

FIGURE 14 is a sectional side elevation of a mold engaged in top and bottom forms and an expander therefor;

FIGURE 15 is a partial side elevation of a mold extension expander;

FIGURE 16 is a partial side elevation of a roofing mold in an expanded position;

FIGURE 17 is a partial side elevation of the roofing mold of FIGURE 16 in a collapsed position;

FIGURE 18 is a partial end elevation of roofing molds;

FIGURE 19 is a graphic representation of the stringers and legs of a sloped roof mold expander;

FIGURE 20 is a partial end elevation of a contractor on a mold cover;

FIGURE 21 is a partial side elevation of the contractor taken along a line 21—21 of FIGURE 20;

FIGURE 22 is a perspective view of a mold with inflatable sides;

FIGURE 23 is a perspective view of an inflatable mold;

FIGURE 24 is a partial sectional view of an edger taken along a line 24—24 of FIGURE 1;

FIGURE 25 is a view of a screed for striking off a first layer of concrete for forming a concrete panel;

FIGURE 26 is a view of the screed of FIGURE 25 adjusted for striking off a second layer of concrete;

FIGURE 27 is a partial end sectional view of the screed taken along a line 27—27 of FIGURE 25;

FIGURE 28 is a partial top view of the screed shown in FIGURES 25 through 27; and FIGURE 29 is a perspective view of a reinforcing I beam which may be used in concrete panels constructed in accordance with this invention.

Figure 4:
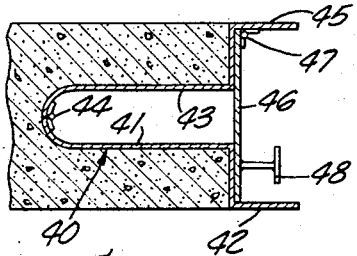
FIGURES 4 and 5 are partial sectional views of an alternative embodiment of the top form shown in FIGURE 1.

Referring now to the drawings, and particularly FIGURES 1 through 6, a knock down form for casting hollow concrete panels is illustrated including a top form 10, bottom form 11 and end form 12 for respectively forming the top, bottom and one end of the concrete panel, such as a wall floor or roof. Collapsible molds, generally designated by reference numerals 13 and 14 are shown in position in the form. In constructing or casting a wall, the top, bottom and end forms are attached to a base 15 by suitable rigid pins, such as a pin 16 shown extending through a hole in a bottom form flange 17 in FIGURE 1.

Before the molds 13 and 14 are positioned, a first layer of concrete is spread within the forms, and a first layer of reinforcing mesh is imbedded into the concrete. The molds 13 and 14 are layed into the forms, a second layer of mesh is positioned over the molds and other reinforcements are added as desired, and a second layer of concrete is poured and leveled to the top of the forms. After the concrete has hardened, the molds 13 and 14 are collapsed and withdrawn from the concrete panel which is then ready for hoisting into its place in a building. A concrete panel is thus formed having a top and bottom configuration determined by the shapes of the top and bottom forms 10 and 11, with a hollow interior defined by the molds 13 and 14 of which there may be more than two. As will appear subsequently, an edger 18 may be provided for forming the edges or sides of the concrete panel.

The top form 10 includes a face 20 against which the top of the concrete panel is formed. The width of the face 20 is the same as the desired thickness of the wall. A large ridge 21 runs lengthwise along the center of the face 20 and protrudes therefrom for forming a raceway in the top of the panel for carrying electrical or plumbing lines. The ridge 21 has tapered sides 22 to provide a draft for facilitating withdrawal of the top form 10 from the panel after the concrete has hardened. Small faces 23 on both sides of the ridge 20 form the top surfaces of the panel against which the loads from the floor or roof thereabove will bear. In order to properly support such loads and distribute them into the wall, the top surfaces formed by the faces 23 and indicated by the reference numeral L in FIGURE 2 should be at least one and one-half inches wide.

Along each side of the ridge 21 are two small ridges 25 in the faces 23 which form grooves in the top of the panel for retaining grout which provides a seal between the panel and the floor or roof thereabove. The grooves provided by the ridges 25 are not necessary, but they better insure that sufficient grout will be retained to form an effective seal and, additionally, it is easier to lay grout into such grooves than onto a flat surface.

A plurality of projections 27 extend from the ridge 21 for receiving and supporting extensions 28 of the mold 13. The projections 27 are formed sufficiently rigid to support one end of the mold 13 and the concrete on top of the mold. The projections 27 are spaced along the top form at appropriate intervals to meet the mold extensions 28. The projections 27 and mold extensions 28 form passages through the concrete integral bond beam formed at the top of the panel to carry electrical or plumbing lines from the raceway formed by the ridge 21 into the hollow interior of the panel. The projections 27 have curved sides for forming passages of sufficient curvature to meet building code requirements regarding radius of curvature for bends in electric lines. The upper portions of the projections 27 at the outer ends thereof are cut away thereby providing shelves 30 (note FIGURE 2) upon which the mold extensions 28 may rest prior to being pushed into the projections and for guiding the extensions.

A base 32 of the top form 10 is perpendicular to the face 20 thereof and projects outwardly from the form. A plurality of gussets 33 are provided to form a brace between the base 32, the backside of the face 20, and a top rail 34. The base 32 may be tapered similar to the base or flange 17 of the bottom form 11 shown in FIGURE 1 so that the widest portions 35 thereof are midway between the pins (such as the pin 16) anchoring the form to the base 15. The tapered base is widest where the greatest strength is required to resist the outward force exerted by freshly poured concrete within the form, and the base is narrower near the pins where less strength is required. By tapering the base, it may be made lighter and less expensive, and the pins may be spaced further apart so that fewer of them need be set and subsequently removed when the forms are removed from a hardened panel. Alternatively, the base may be in the form of a truss 36 as shown in FIGURE 3, or a truss of this nature may be built out from the base 32 to provide additional structural strength. The rail 34 extends outwardly from the top form 10 as shown in FIGURE 2 and provides rigidity to the form and a track upon which a screed, which will be discussed subsequently, can ride.

Figure 5:
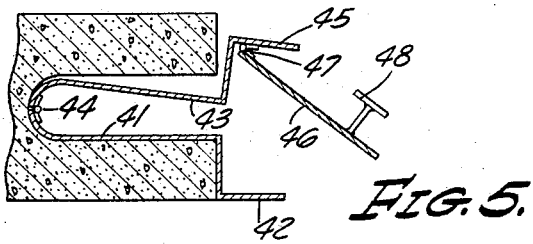

In some instances it is necessary to provide a large or deep raceway in the top of a concrete panel to accommodate a number of electrical or plumbing lines. In this case, the raceway may be made even deeper as shown in FIGURES 4 and 5. However, a top form of this depth is difficult to withdraw from the hardened concrete unless it is collapsible. Accordingly, the top form as shown in FIGURES 4 and 5 may include a ridge 40 having a lower section 41 attached to or made integral with a base 42 (such as the base 32 shown in FIGURE 2), and coupled to an upper section 43 by a hinge 44. The upper section 43 may be formed integral with or attached to an upper rail 45. Preferably, the hinge 44 is placed at the innermost point of the ridge. The hinged form is maintained in an expanded position by a support 46 which has a hinge 47 coupled with the underside of the top rail 45. A handle 48 is connected with the support 46, and when the handle 25 is pulled the support moves outwardly allowing the form to collapse as illustrated in FIGURE 5. A number of the supports 46 are provided and located along the form as required. With this hinged form, it is not necessary to provide a draft to the sides of the ridge, and the sides thereof may be straight as illustrated in FIGURE 4. Thus, the top portions and surfaces of the panel on each side of the raceway may be wider and stronger.

The bottom form 11 (note FIGURE 6) includes a bulkhead 50 having a plurality of apertures 51 shaped to fit the periphery of the collapsible molds. Thus, the tops of the apertures are flat to conform to the flat tops of the molds, and the sides thereof have the same arc as the sides of the molds. Bulkhead 50 includes projections 52 which extend upwardly and define the bottom 53 of the apertures 51. The bottoms 53 of the apertures 51 are level with the top of the first layer of concrete, and since the molds 13 and 14 are bottomless, the projections 52 can extend upwardly into the molds and not interfere with the withdrawal thereof after the concrete has hardened.

The bulkhead 50 gives some added strength and rigidity to the form but is provided primarily to prevent stray concrete from seeping out from the form and hardening into an irregular bump on the bottom of the panel which would have to be removed before the panel could be set squarely upon a floor. However, it is likely that there will be some seepage of concrete between the tops of the molds and the tops of the apertures 51 as well as between the sides of the molds and the sides of the apertures. Thin strips 55 (note FIGURE 8) of resilient material thus are affixed to the inner face of the bottom form 11 around the apertures 51 in the bulkhead 50 to prevent such seepage. The resilient strips 55 rim the apertures and protrude into the form somewhat thereby providing a seal between the molds and the bottom form 11 when the molds are layed into the form.

When a completed panel is lifted into place, it generally is set upon a layer of grout spread on the floor of a building. Thus, preferably, the inside face 56 of the bottom form 11 is inclined inwardly to form a V shaped space in the bottom of the panel. As the wall is lowered into the grout, the grout spreads into this space providing a reliable joint.

Figures 6, 7, 8:
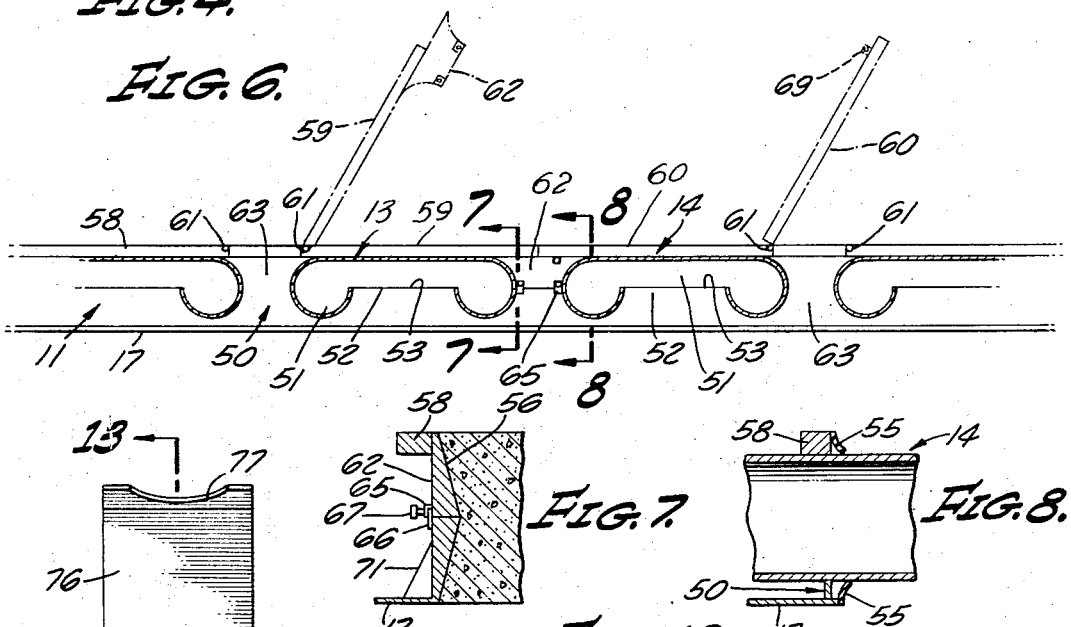
FIGURE 6 is an elevational view of a bottom form shown in FIGURE 1 illustrating hinged rails.
FIGURE 7 is a partial sectional view taken along a line 7—7 of FIGURE 6.
FIGURE 8 is a partial sectional view taken along a line 8—8 of FIGURE 6.

The top of the form 11 includes a rail 58 which is removable for facilitating insertion of the molds into the apertures 51. The entire rail 58, as well as portions of the bulkhead between the molds, may be made removable. In this manner, the upper half of the form 11 may be uncoupled or disconnected from the bottom half thereof to facilitate insertion of the molds. Alternatively, the rail 58 may include a plurality of hinged strips, such as strips 59 and 60 shown in FIGURE 6. The phantom lines in FIGURE 6 illustrate these strips 59 and 60 in their open positions for allowing insertion of the molds 13 and 14. Hinges 61 are provided for the strips, and preferably are vertically aligned above the beginning of the rounded or arced portion of the apertures 51. A section 62 of the bulkhead 50 is attached to, and movable with, the strip 59. As will be apparent, it is only necessary to separate the bulkhead 50 to provide a section 62 between every other mold. Thus, the remaining sections 63 of the bulkhead 50 are solid and fixed. The hinges 61 are placed as near the top of the strips 59 and 60 along the rail 58 as practical in order to minimize the clearance needed between the fixed and movable portions of the rail to permit hinge action. The ends of the strips 59 and 60 abut when they are in a closed position. The strip 60 is opened first and then the strip 59 is opened.

Figure 9:
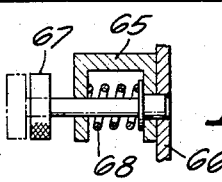
FIGURE 9 is a fragmentary sectional view of a spring lock which may be used with the hinged rail of FIGURE 6.

When the strips 59 and 60 are closed, it is preferable that they be rigidly held in alignment with the remainder of the form 11. Accordingly, sockets 65 and pegs 66 (note FIGURE 7) may be provided on the bulkhead 50 for this purpose. The sockets 65 are placed above the pegs 66 to prevent concrete from collecting in the sockets. Preferably, a pin 67 is employed to lock the socket 65 and peg 66 together as shown in FIGURE 7. A spring lock having a spring 68 for maintaining the pin 67 in place by bearing against the socket 65 as shown in FIGURE 9 may be provided. The pin 67 is released by pulling it to the left as shown in FIGURE 9. A similar socket arrangement 69 may be provided on the strip 60 for locking it in a closed position. If the entire top half of the form 11 is made removable rather than providing the hinged strips 59 and 60, similar sockets and pegs may be provided along the bulkhead between the molds for locking the halves together.

The bottom form 11 is supported by the base plate or flange 17 extending away from the form. Gussets 71 are provided for reinforcing the bulkhead and base, and the base may be tapered or trussed as shown respectively in FIGURES 1 and 3.

An alternative form of coupling for the strips 59 and 60, or the upper and lower halves of the bulkhead 50, is illustrated in FIGURES 10 and 11. A socket 73 may be affixed to, and extend downwardly from, a strip 59 or 60 or the upper half of the bulkhead 50 and engage with a peg 74 affixed to the lower portion of the bulkhead 50. Preferably, the socket 73 and peg 74 have mating tapers for facilitating engagement of the two and for providing a snug joint when the peg is fully inserted into the socket. This configuration enables the portions of the bottom form 11 to be appropriately held in alignment.

Figure 12:
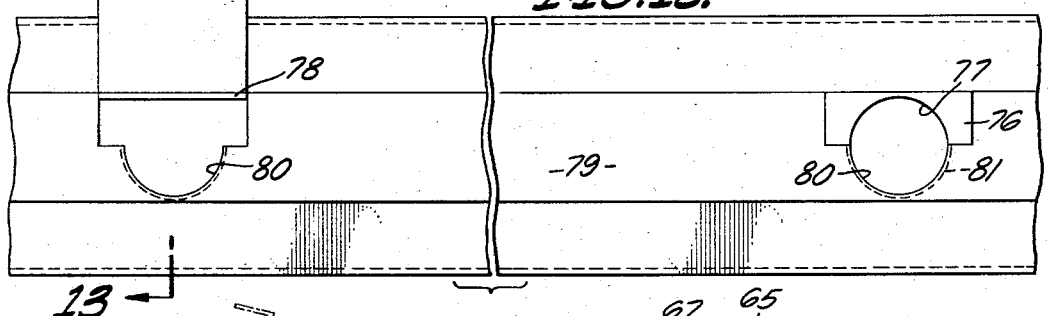
FIGURE 12 is a partial elevational view of an alternative top form for use in FIGURE 1.
Figure 13:
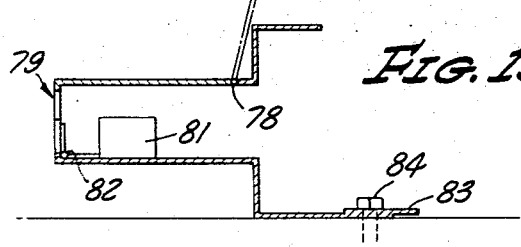
FIGURE 13 is a sectional view taken along a line 13—13 of FIGURE 12.

An alternative configuration for the top form 10 is illustrated in FIGURES 12 and 13. Instead of the protrusions 27 shown in FIGURE 1, hatches 76 having arcuate ends 77 are hinged at 78 to the upper side of a ridge 79 of the form. When the hatches 76 are open, the mold extensions 28 may be layed directly into the ridge 79 of the top form thereby obviating the sliding of the extensions into the form. These hatches 76 are particularly advantageous when hoists are utilized to lower the molds 13 and 14 down into the form. The hatches 76 are hinged above apertures 80 through which the mold extensions 28 protrude. When the hatch 76 is closed, the arcuate end 77 thereof fits snugly over the mold extension 28. Short lengths of half pipe 81 are positioned inside the ridge 79 to coincide with the mold extensions 28 thereby allowing the extensions to rest thereupon rather than merely upon the interior periphery of the openings 80 which may tend to cut into and damage the mold extensions. A hinge 82 may be provided at the bottom of the ridge 79, rather than in the center thereof as is the hinge 44 in FIGURES 4 and 5, for providing greater clearance in lapsing the mold. With this hinge arrangement a greater portion of the mold is freed from the concrete panel when the top form is collapsed than as illustrated in FIGURE 5. Furthermore, pry tabs 83 may be provided on the base of the top form to facilitate removal thereof if the form sticks to the concrete panel. A pry bar may be inserted unter the tab 83 after the pins 84 have been removed for prying loose the form.

Each of the collapsible molds 13 and 14 includes a cover 85 (note FIGURE 14), a bulkhead 86 and the extensions 28. Each mold further includes a frame 87 for supporting the cover 85 and causing it to be expanded or collapsed. The bulkhead 86 permits a mass of concrete 88 to be formed between the bulkhead and the top of the mold. This mass of concrete serves as an integral bond beam within the panel for receiving the loads from the floors or roof above the panel and distributing the loads down into the panel. The beam also improves the lateral resistance of the panel to earthquakes. As noted previously, the mold extensions 28 support one end of the mold and form passageways through the beam for passage of electrical or plumbing lines.

The frame 87 includes an upper stringer 90, a lower stringer 91, and legs 92 through 94 coupled between the stringers by hinge pins. The leg 92 is channeled to receive a handle 95. Rotation of the handle 92 clockwise moves the legs angularly permitting the stringers 90 and 91 to move together thereby collapsing the frame 87. When the frame 87 collapses, the arcuate sides of the mold collapse both in a vertical and horizontal direction. When the handle 95 is moved to orient the legs perpendicular to the stringers, the stringers push against the top and bottom of the arcuate sides of the mold causing the mold to be expanded in both the vertical and horizontal directions against the interior face of the apertures 51 (FIGURE 6). A pin 96 may be provided on each of the legs 92 to lock the frame 87 in an expanded position.

An extension expander frame 98 is provided for the mold extension 28 and includes an upper stringer 99 and a lower stringer 100. The stringers 99 and 100 are joined by legs 101 through 105 which are pinned to the stringers. When the legs are perpendicular to the stringers, the extension 28 is expanded. A cover 106 is provided for each of the extensions 28 and is formed of a resilient material and attached to the upper stringer 99 of the frame 98. The cover 106 is sufficiently long and large to prevent seepage of concrete into the extension, main mold or top form. Expansion of the stringers of the main mold frame 87 expands the extension stringers 99 and 100. As the last leg 94 of the frame 87 moves into a perpendicular position, it pushes the leg 102 of the extension expander frame 98 causing the legs thereof to move to a position perpendicular to the stringers 99 and 100. When the expander frame 87 is collapsed, the last leg 94 thereof engages a stud 107 on the extension frame 98 causing the extension frame to collapse.

It should be noted that the stringer 100 of the extension frame 98 is tapered thereby causing the extension 28 to form a tapered or somewhat conical passageway through the concrete integral beam thereby facilitating withdrawal of the extension from the hardened concrete. Without this taper, the extension may hang on the hardened concrete making it difficult to withdraw because the extension cover collapses less than the main mold cover. Thus, the tapered extension provides an equalizer between the small contraction of the extension as compared to the main mold.

The forward leg 105 includes a top portion 108 (note particularly FIGURE 15) forming a hook. When the extension frame 98 is expanded with the leg 105 in a vertical position, the hook 108 of the leg 105 projects into a hole or slot (not shown) in the ridge 21 of the top form 10. The hook is, of course, retracted from the slot when the frame 98 is collapsed. The hook 108 on the leg 105 serves to lock the mold extension 28 and the top form 10 together causing the mold to brace the top form thereby reducing the number of pins necessary for anchoring the top form. Thus, movement of the handle 95 both expands the main mold and extension and causes the mold to be locked to the top form. If the frames 87 and 98 fail to collapse because of some malfunction, a socket 109 is provided in the end of the stringer 99 for receiving the end of a rod which may be passed through the top form 10 and pushed against the stringer 99 for loosening the frame.

The bottom form 11 also may be braced by the mold 13. A bar 110 is provided near the outer end of the mold 11 and may be fastened to the top of the mold 13 by bolts 111. Preferably, slotted holes are provided in the top of the mold to allow relative adjustment between the mold and the bar 110 so that the bar 110 presses tightly against the top of the bottom mold 11. This arrangement prevents the bottom form 11 from bowing out because of the pressure of freshly poured concrete. Additionally, this arrangement, as well as the hooking arrangement for the extension frame 98, for locking the molds to the forms improves the transmission of vibration between them and hence results in better vibration and proper settling of the concrete.

The bulkhead 86 of the mold 13 includes a diaphragm 115 suitably affixed to the end of the mold (top, bottom, and arcuate sides thereof). A ring and/or rivets may be used for securing the diaphragm to the mold. The diaphragm is made of a resilient material, such as neoprene, so that it will not interfere with the expansion and contraction of the extension frame 98 which protrudes through the diaphragm. The bulkhead 86 further includes a flap 116 hinged to a narrow face 117 at the end of the mold. The flap 116 extends between the extension frames 98 and overlaps the diaphragm 115. Preferably, the flap 116 is formed of a flexible material, such as neoprene, so that if concrete seeps under it, the flap will not become stuck in the concrete. The hinged arrangement of the flap 116 facilitates pulling the flap over any seeped concrete which has hardened.

A modified mold 120 is illustrated in FIGURES 16 through 18 for casting integral roof sections containing the roof surface, tapered means to support the roof and a ceiling. A problem is presented in providing a mold which expands more at its innermost end in order to provide a slope to the roof and to provide a taper to the beams alternating with the hollow roof sections. A mold expander with merely different length legs will not properly collapse at the end thereof with the longest leg. Accordingly, a mold expander frame 121 is shown in FIGURES 16 and 17, with a graphic illustration of its construction shown in FIGURE 19, which provides a complete collapse of stringers 122 and 123 thereof. Legs, such as legs 124 through 127, are of different lengths and are coupled with the stringers at different angles. Referring to FIGURE 19, line A–B represents a bottom stringer, line C–D represents a top stringer, and the transverse lines between the lines A–B and C–D represent the legs of the frame. With A–C representing the least distance between the stringers, and B–D representing the greatest distance, the distance C–K is selected to be seven-eighths of A–E for providing a desired sloping frame as illustrated graphically in FIGURE 19. In this illustration, the individual segments (A–E, E–F, etc.) along the line A–B are equal, and the individual segments (such as C–K, K–L, etc.) are equal. The legs are then cut to the lengths as indicated by the diagram in FIGURE 19, drilled and pinned to the stringers at the points A, C, and E through P.

An extension pin 130 is affixed to the end of the upper stringer 122 and protrudes into an aperture, or a socket 131, on an I beam 132. The socket 131 may be a short length of pipe. This arrangement serves to lock the frame 121 to the I beam 132 which is used to reinforce the concrete. As will be apparent, the I beam 132 may be appropriately supported at ends of the over-all form for maintaining this beam in place.

The mold 120 includes a cover 134, and a diaphragm 135 affixed to the inner end thereof. A flap 136, similar to the flap 116 in FIGURE 14, hinged at 137 also may be provided. The diaphragm 135 includes an aperture 138 through which the pin 130 of the frame 121 may extend. As with the bottom form 11 shown in FIGURE 14, a bar (not shown) may be affixed to the top of the mold 120 and positioned against the top of the roof side form 140 to aid in maintaining this form in position when concrete is poured.

The cover 134 of the mold 120 may have a bottom as illustrated in FIGURE 18, or may be bottomless as illustrated in FIGURE 20. The sides 144 of the cover 134 must be wider at the inner end (adjacent the beam 132) of the mold than at the outer end thereof for providing the appropriate taper for the hollow space within the roof panel. In order to insure that the inner end will collapse sufficiently for the mold 120 to be withdrawn through apertures in the side form 140, a depressor arrangement as illustrated in FIGURES 20 and 21 may be provided. A pin 145 protrudes through a slot 146 in a bottom stringer 147. The pin 145 is attached at its ends 148 and 149 to the inner face of the mold cover 134. When the mold is collapsed, the slot in the bottom stringer 147 bears against the pin 145 which in turn raises the lower end of the arcuate side 144 of the cover 134 to a completely collapsed position. Although the legs of the expander frame are shown in FIGURE 21 perpendicular to the stringers for convenience of illustration, it will be appreciated that where a tapered mold is provided, the legs will be arranged substantially as illustrated in FIGURE 16. Also, it will be appreciated that suitable reinforcing rods or mesh may be used in the top and bottom of the roof panel as well as between the molds.

FIGURES 22 and 23 illustrate alternative molds. The mold shown in FIGURE 22 includes inflatable sides 160 and 161. This mold further includes a top 162 and cross members 163 of rigid material. Preferably, the cylindrical sides 160 and 161 are made of rubber or similar material which will hold air under sufficient pressure to support the concrete placed upon the mold and the top 162 and members 162 are made of metal. Valves 164 are provided for inflating the sides 160 and 161. Extensions 166, which may be cylindrical or conical, are formed of rubber or similar material and protrude from one end of the mold. Inasmuch as dragging a deflated mold over the first layer of concrete may blemish this layer, a "litter" is incorporated into the mold to facilitate placing the mold in the proper position within the forms. The "litter" includes handles 167 affixed by means of graces 168 to the top 162 of the mold.

The mold shown in FIGURE 23 is made of a resilient material, such as rubber, and includes a top 169, a bottom, sides 170, ends 171, and bulkheads 172 joined together in an airtight manner so that the entire mold will be inflated with sufficient air pressure to support concrete applied thereover. A valve 173 is provided for inflating the mold. The bulkheads 172 give strength and shape to the mold, but are provided with holes 174 to permit air to pass between the various chambers of the mold. Extensions 175, which may be cylindrical or conical, are formed of rubber or similar material and protrude from one end of the mold. A "litter" for facilitating movement of the mold is provided and includes a pair of handles 176 extending through the mold.

As briefly discussed previously in connection with FIGURE 1, an edger, generally designated by the reference numeral 18, may be used for forming the edge of a concrete panel. Reference now is made to FIGURE 24 which shows a fragmentary cross-sectional view of the top of the edger 18. Although not shown, a lower edger is layed along the base 15 (FIGURE 1) perpendicular to the top and bottom forms 10 and 11. The lower edger has the same thickness as the thickness of the lower face of the concrete panel beneath the mold. The mold 13 is layed over the lower edger, and an upper edger 180 as shown in FIGURE 24 is placed over the mold. The upper and lower edges may be held in place by rubber cement or a similar adhesive. A bulkhead 181 (note FIGURE 1) is positioned between the end of the mold 13 and the face 20 of the top form 10. The end of the bulkhead 181 abutting the face 120 has the same configuration as the ridges 21 and 25. An aperture 182 is provided in the bulkhead to permit reinforcement bar to protrude beyond the panel section and extend into the end cavity of the next panel section for providing a tie between panel sections if desired. A small opening 183 exists between the inner faces of the top and bottom edgers and the mold through which a wire mesh 184 (see FIGURE 24) may protrude and extend between panel sections. In order to insure that the protrusion of wire mesh 184 will not interfere with a close fit between the edges of adjacent panel sections when installed, small lips 185 are provided on the innermost edges of the top and bottom edgers to form small spaces in the panel through which the mesh can be folded to pass into the end cavities as indicated by a dotted line 186 in FIGURE 24. In this manner, the protruding mesh can be folded into the cavity formed by the mold leaving no obstruction along the side surfaces of the finished panel.

A filler block designated by reference numeral 188 in

FIGURE 1, may be layed between the mold and the top form 10 and separated from but near the edger 18 to provide an opening through the concrete bond beam at the top of the panel through which concrete can be poured into the end cavity (formed by the mold) for securing the panel to another panel or structural member. The block 188 is similar in configuration to the bulkhead 181.

Reference is now made to FIGURES 25 through 28 which illustrate a screed apparatus which may be employed in the casting of concrete panels. The screed has a number of functions and it serves to: spread the first thin layer of concrete; vibrate the concrete, and thereby permit the use of dryer and therefore stronger concrete; spread concrete under the ridge in the top form; embed wire mesh into the concrete; lift over the folds in the wire mesh; level off the concrete to the top of the forms; and press the larger aggregate under the surface of the concrete to produce a smoother finish thereon.

The screed includes a rotating cylinder 190 for distributing the concrete. The cylinder 190 is formed from two cylindrical sections 191 and 192 joined by a threaded connection 193. A threaded stud 193 (note FIGURE 26) on the section 191 is joined with threads on the interior of the cylinder 192. The stud is of relatively large diameter and long so that the connection is strong to prevent bowing of the cylinder. The direction of the threads is opposite to the direction of rotation of the cylinder 190.

The cylinder 190 is suspended from a beam 195 by a pair of end brackets 196 and 197. The ends of the brackets 196 and 197 include bearings (not shown) for rotatably supporting a shaft 198 projecting from the ends of the cylinder 190. The cylinder 190 is rotated through a drive 199 connected to a motor 200 resting on the beam 195. A flat screed 202 (note FIGURE 27) follows the rotating cylinder 190, and is suspended from the beam 195 by brackets 203.

Fins 205 which embed the wire mesh into the concrete are supported by brackets 206. The brackets 206 are fixed to a rotatable bar 207 resting in bearing blocks 208 attached to the beam 195. When the screed makes its last pass over the concrete, the fins 205 are rotated up out (note FIGURE 26) of the way by turning the bar 207, which then may be prevented from turning by pins 209 inserted into matching holes in the bar and the bearing blocks.

The beam 195 is supported at its ends by lifters 214 and 125 which have apertures through which the beam may be slid when it is desired to change the length or position of the screed. Locking bolts, such as a bolt 215 includes ball bearing rollers (not shown) substantially at the corners thereof which ride on two slider bars 217 and 218 (note FIGURE 27). Each of the lifters 214 and 215 is raised or lowered by a lever linkage coupled to the lifters. The lever linkage for the lifter 214 is shown in FIGURE 27 and includes a handle lever 219 and a cam lever 220 coupled by a pin 221. The lever 219 is hinged to an upper cross member 222 of the lifter chassis by a pin 223. The lifter chassis includes a cross member 222, and upright members 225 and 226 which support the respective slider bars 17 and 218. The lower ends of the upright members 225 and 226 are affixed to a lower cross member 227. The members 225 and 226 also are affixed to right angle arms 228 and 229 which carry flanged wheels 230 and 231. The arms 228 and 229 allow the screed to extend out beyond both the top and bottom forms when screeding off the second layer of concrete level to the top of the forms. It will be apparent that the beam 195, and thus the cylinder 190, may be raised and lowered by operating the handle lever 219.

The height of the screed for regulating the thickness of the first layer of concrete is adjusted by means of lock bolts 233 and 234 (note FIGURES 25 and 26) threaded through the lower cross members of the lifter chassis at each end of the beam. Thus, the ends of the bolts 233 and 234 bear against the underside of the ends of the beam. Concrete is spread under the ridge 21 of the top form 10 by means of a small extension screed 236 attached to the beam 195 by a bracket 237. This screed 236 is sloped as necessary to fit under the ridge 21. The bracket 237 is removable from the beam 195 to allow the screed 236 to be removed after the first layer of concrete is spread.

After the first layer of concrete with a first layer of mesh embedded therein has been screeded, the screed is lengthened and raised. One section (191 or 192) of the screed cylinder 190 is removed and a longer section is substituted, and none of the brackets 196 and 197 is moved out further on the beam to accommodate the larger cylinder.

The screed is propelled by a motor (not shown) which may be mounted on a lifter chassis and connected to a drive shaft which in turn is connected to drives for the flanged wheels.

FIGURE 29 illustrates an I beam for reinforcing the concrete columns between molds. The I beam may be constructed from bars 240 which are welded to cross bars 241 to form a "ladder" which is the web of the beam. Additional bars 242 may be welded to cross members 243 to form the flanges of the beam.

As can be seen from the foregoing description, improved apparatus has been provided for forming concrete panels having hollow cores to provide wall, floor, and roof members. The simplicity and ease in handling of the present apparatus enables the panel to be constructed at the building sight, and thus reduces costs by eliminating transportation expenses. The panels can be easily reinforced, if necessary, and thus a structure of desired strength may be constructed.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A device for casting hollow core concrete panels comprising a pair of longitudinal form means, a first of said form means including a ridge and a plurality of tapered projections extending therefrom, and a second of said form means having a plurality of elongated apertures therein, and collapsible hollow mold means inserted in said apertures, each of said mold means including tapered mold extensions protruding into said projections extending from the ridge of said first form means and substantially forming a seal therewith for preventing seepage of concrete into said first form means and said mold means.

2. A device for casting hollow core concrete panels comprising a pair of longitudinal form means, a first of said form means including a ridge and a plurality of tapered projections extending therefrom, and a second of said form means having a plurality of elongated apertures therein, edger means extending between said form means in a substantially perpendicular relationship therewith, said edger means having its ends shaped to substantially form a wet concrete seal with said form means, and collapsible hollow mold means inserted in said apertures, each of said mold means including tapered mold extensions protruding into said projections extending from the ridge of said first form means and substantially forming a wet concrete seal therewith for preventing seepage of concrete into said first form means and said mold means.

3. A device for casting hollow core concrete panels comprising
   a pair of longitudinal form means, a first of said form means including a ridge having a plurality of tapered projections extending therefrom, and a second of said form means having a plurality of elongated apertures therein,
   edger means extending between said form means in a substantially perpendicular relationship therewith, said edger means having an end shaped to substantially form a wet concrete seal with said first form means, said edger means including at least a ridge along a side thereof for forming an elongated notch along an edge of a concrete panel, and
   collapsible hollow mold means inserted in said apertures, each of said mold means including tapered mold extensions protruding into said projection extending from the ridge of said first form means and substantially forming a wet concrete seal therewith for preventing seepage of concrete into said first form means and said mold means.

4. A device for casting hollow core concrete panels comprising
   a pair of longitudinal form means, a first of said form means including a ridge and a plurality of tapered projections extending therefrom, and a second of said form means having a plurality of elongated apertures therein,
   collapsible hollow mold means inserted in said apertures, each of said mold means including tapered mold extension protruding into said projections extending from the ridge of said first form means and substantially forming a seal therewith for preventing the seepage of concrete into said first form means or said mold means, and
   said mold means including side expanders coupled with a tapered extension expander, said side expanders serving to expand the sides of said mold means against the face of said apertures, and said extension expander extending through said mold extensions for expanding them into said projections.

5. A device for casting hollow core concrete panels comprising
   a pair of longitudinal form means, a first of said form means including a ridge and a plurality of projections extending therefrom, and a second of said form means including at least a pair of mating sections forming said second form means, said second form means having a plurality of elongated apertures therein, and
   collapsible hollow mold means inserted in said apertures by removing said sections, each of said mold means including mold extensions protruding into said projections extending from the ridge of said first form means and substantially forming a seal therewith for preventing seepage of concrete into said first form means or said mold means.

6. A device for casting hollow core concrete panels comprising
   a pair of longitudinal form means,
   a first of said form means including a ridge and a plurality of tapered projections extending therefrom, and
   a second of said form means including a bulkhead having a plurality of elongated apertures therein and a rail coupled with said bulkhead, said rail having hinged sections which may be moved to allow the insertion of a hollow mold means into said apertures and for facilitating connection of said mold means with said projections.

7. A device for casting hollow core concrete panels comprising
   first form means including a ridge projecting therefrom having hinge means enabling said ridge to be compressed, said first form means including support means for expanding said ridge,
   second form means having a plurality of apertures therein for supporting a hollow mold and for facilitating connection of said mold with said ridge, and
   means supporting said first and second form means in a fixed relationship.

8. In a device for casting hollow core concrete panels, an elongated form for providing a deep raceway in an end of a panel comprising
   a base member,
   a rail member,
   a substantially U-shaped ridge means having means coupling the sections thereof respectively to said base member and to said rail member,
   said ridge means having at least two sections and hinge means substantially at the peak of said ridge means coupling said sections together, and
   support means for engaging said base member and said rail member to position said ridge means in an expanded position.

9. A device for casting hollow concrete panels comprising
   first form means including a plurality of apertures for receiving a plurality of mold means,
   second form means having a ridge extending therefrom, said ridge having a plurality of openings therein for receiving extensions of said mold means and a plurality of hatch means hinged adjacent said openings for facilitating insertion of said extensions into said openings, said hatch means having arcuate ends defining a part of said openings and engaging said extensions when said hatch means is closed to substantially form a seal with said extensions, and
   means coupled with said first and second means for maintaining them in a fixed relationship.

10. A device for casting hollow core concrete panels comprising
    first form means including a plurality of apertures for receiving a plurality of mold means having extensions,
    second form means having a hinged ridge extending therefrom, said ridge having a plurality of openings therein for receiving said extensions of said mold means and having a plurality of hatch means hinged adjacent said openings and including arcuate ends defining a part of said openings, said second form means further including support means coupled therewith for maintaining said ridge in an expanded position, and
    means coupled with said first and second form means for maintaining them in a fixed relationship.

11. A device for casting hollow core concrete panels for use as walls, floors, roofs and the like, a form for one end of a panel comprising
    a hinged ridge extending from said form substantially along the entire length thereof,
    said ridge having a plurality of openings therein for receiving extensions of mold means,
    said ridge including a plurality of hatch means hinged adjacent said openings and including arcuate ends defining a part of said openings, and
    support means for maintaining said ridge in an expanded position.

12. A device for casting hollow concrete panels comprising
    a first form means having a plurality of elongated apertures therein,
    a plurality of collapsible hollow mold means having first and second ends having their first ends inserted within said apertures, said mold means in an expanded position being tapered between said first and second ends whereby the second ends thereof are larger than the first ends thereof to provide a tapered core in a concrete panel, said mold means having resilient bulkheads substantially covering the second ends thereof, said mold means including side expanders each of which includes a pair of stringers coupled by hinged legs of different lengths mounted thereon for positioning said mold means in said expanded position, support means, said side expanders including projections for extending through the bulkheads of said mold means and coupling said mold means with said support means.

13. A device for casting concrete panels having hollow cores comprising a pair of longitudinal form means, a first of said form means having a ridge and said ridge having projections, and a second of said form means having a plurality of elongated apertures therein, and inflatable mold means having at least sides constructed of a resilient and inflatable material inserted in said apertures, each of said mold means including extensions coupled with the projections of said ridge of said first form means.

14. A device for casting hollow core concrete panels comprising a pair of longitudinal form means, a first of said form means including a plurality of tapered projections extending therefrom, and a second of said form means having a plurality of elongated apertures therein, resilient means arranged about at least a portion of said apertures, and collapsible hollow mold means inserted in said apertures, said resilient means forming a seal with at least a portion of said mold means, each of said mold means including tapered mold extensions protruding into said projections extending from said first form means and substantially forming a seal therewith for preventing seepage of concrete into said first form means and said mold means.

15. A device for casting hollow core concrete panels comprising a pair of longitudinal form means, a first of said form means including a plurality of tapered projections extending therefrom, and a second of said form means having a plurality of elongated apertures therein, and collapsible hollow mold means inserted in said apertures, each of said mold means including tapered mold extensions protruding into said projections of said first form means and substantially forming a seal therewith for preventing seepage of concrete into said first form means and said mold means.

16. A device for casting hollow core concrete panels comprising, a pair of longitudinal form means, a first of said form means including coupled sections, said first form means having a plurality of holes therein and hatch means adjacent said holes, and a second of said form means including at least a pair of mating sections forming said second form means, said second form means having a plurality of elongated apertures therein, collapsible hollow mold means inserted in said apertures, each of said mold means including tapered mold extensions protruding into said holes in said first form means, said mold means including side expanders coupled with a tapered extension expander, said side expanders serving to expand the sides of said mold means against the face of said apertures and said extension expander extending through said mold extensions for expanding them into said holes, and edger means extending between said form means in a substantially perpendicular relationship therewith, said edger means having its ends shaped to substantially form a wet concrete seal with said form means.

17. A device as in claim 16 wherein said mold means are made of a resilient and inflatable material.

References Cited
UNITED STATES PATENTS

| | | | |
|---|---|---|---|
| 178,105 | 5/1876 | Brown | 249—147 |
| 738,423 | 9/1903 | Durant | 249—145 |
| 814,657 | 3/1906 | Low | 249—145 |
| 826,599 | 1/1906 | Normandin | 249—151 X |
| 877,874 | 1/1908 | Tsanoff | 249—142 X |
| 1,247,573 | 11/1917 | Peterson et al. | 249—146 |
| 1,294,254 | 2/1919 | Funk | 249—150 |
| 1,451,049 | 4/1923 | Newman | 249—150 X |
| 1,476,684 | 12/1923 | Block et al. | 249—146 |
| 1,705,201 | 3/1929 | Nagel | 249—142 X |
| 2,206,803 | 7/1940 | Brimhall | 249—145 X |
| 2,882,582 | 5/1959 | McLennan | 249—147 XR |
| 2,885,761 | 5/1959 | Serpe | 249—170 |
| 3,213,512 | 10/1965 | Glass | 25—128 |
| 3,222,749 | 12/1965 | Haas | 25—128 X |

FOREIGN PATENTS

| | | |
|---|---|---|
| 145,021 | 2/1952 | Australia. |
| 1,091,822 | 11/1954 | France. |

J. SPENCER OVERHOLSER, *Primary Examiner.*

HOWARD J. FLINT, JR., *Examiner.*